(12) United States Patent
Fong et al.

(10) Patent No.: US 8,711,747 B2
(45) Date of Patent: Apr. 29, 2014

(54) POWER SAVING METHODS FOR WIRELESS SYSTEMS

(75) Inventors: Mo-Han Fong, Ottawa (CA); Hang Zhang, Nepean (CA)

(73) Assignee: Apple Inc., Cupertino, CA (US)

( * ) Notice: Subject to any disclaimer, the term of this patent is extended or adjusted under 35 U.S.C. 154(b) by 864 days.

(21) Appl. No.: 12/831,052

(22) Filed: Jul. 6, 2010

(65) Prior Publication Data

US 2011/0261739 A1    Oct. 27, 2011

Related U.S. Application Data

(63) Continuation-in-part of application No. 12/589,549, filed on Jul. 6, 2009, now abandoned.

(60) Provisional application No. 61/223,096, filed on Jul. 6, 2009, provisional application No. 61/078,640, filed on Jul. 7, 2008.

(51) Int. Cl.
    *G08C 17/00*    (2006.01)

(52) U.S. Cl.
    USPC ............... 370/311; 455/343.2; 455/343.4

(58) Field of Classification Search
    USPC ............ 370/310, 311; 340/7.32, 7.33, 7.35, 340/7.36; 455/130, 334, 343.1, 343.2, 455/343.3, 343.4
    See application file for complete search history.

(56) References Cited

U.S. PATENT DOCUMENTS

| | | | |
|---|---|---|---|
| 5,845,077 A * | 12/1998 | Fawcett ..................... | 709/221 |
| 6,453,337 B2 | 9/2002 | Miller et al. | |
| 6,529,784 B1 | 3/2003 | Cantos et al. | |
| 6,560,604 B1 | 5/2003 | Fascenda | |
| 6,769,031 B1 | 7/2004 | Bero | |
| 6,871,216 B2 | 3/2005 | Miller et al. | |

(Continued)

FOREIGN PATENT DOCUMENTS

WO    WO 2007133034 A2 *    11/2007

OTHER PUBLICATIONS

C80216m-08_620—Proposal for IEEE 802.16m Power Saving Schemes by Mo-Han Fong, Hang Zhang, Sophie Vrzic, Robert Novak, Jun Yuan, Dongsheng Yu, Hosein Nikopourdeilami, Kathiravetpillai Sivanesan; submitted on Jul. 7, 2008 available at http://ieee802.org/16/tgm/contrib/C80216m-08_620.pdf (13 pages).

(Continued)

*Primary Examiner* — Chi Pham
*Assistant Examiner* — Weibin Huang
(74) *Attorney, Agent, or Firm* — Meyertons, Hood, Kivlin, Kowert & Goetzel, P.C.

(57) ABSTRACT

Methods for saving power and facilitating transitions from power-saving states back to active states in mobile stations are provided. A base station transmits indication of a periodic interval at which system configuration information is to be transmitted, periodically transmits a current version of system configuration information and in advance of an action time of a new version of system configuration information, periodically transmits the new version of system configuration information at the periodic interval; and transmits a flag indicating whether the new version of system configuration information is available. In respect of each of at least one mobile station in a power-saving state, in which the mobile station (MS) is configured on a per-MS basis to periodically wake up and check for the presence of an information block relevant to the MS, the base station transmits an information block presence indicator indicative of whether the information block is present.

20 Claims, 16 Drawing Sheets

(56) References Cited

U.S. PATENT DOCUMENTS

| | | |
|---|---|---|
| 6,889,067 B2 * | 5/2005 | Willey .......................... 455/574 |
| 6,895,431 B1 | 5/2005 | Bero |
| 6,934,749 B1 | 8/2005 | Black et al. |
| 7,020,696 B1 | 3/2006 | Perry et al. |
| 7,051,097 B1 | 5/2006 | Pecina |
| 7,143,153 B1 | 11/2006 | Black et al. |
| 7,188,163 B2 | 3/2007 | Srinivasan et al. |
| 7,243,163 B1 | 7/2007 | Friend et al. |
| 7,246,156 B2 | 7/2007 | Ginter et al. |
| 7,287,097 B1 | 10/2007 | Friend et al. |
| 7,673,023 B1 | 3/2010 | Nelson et al. |
| 8,588,157 B2 * | 11/2013 | Sagfors et al. ................ 370/329 |
| 2006/0029011 A1 * | 2/2006 | Etemad et al. ................ 370/311 |
| 2009/0316603 A1 * | 12/2009 | Amerga et al. ............... 370/254 |

OTHER PUBLICATIONS

Office Action for related U.S. Appl. No. 12/589,549 dated Jan. 27, 2011 (5 pages).

\* cited by examiner

POWER SAVING METHODS FOR WIRELESS SYSTEMS

CROSS REFERENCE TO RELATED APPLICATIONS

This application is a continuation-in-part of the non-provisional application (serial No. 12/589,549 resulting from conversion under 37 C.F.R. §1.53(c)(3) of U.S. provisional patent application No. 61/223,096 filed on Jul. 6, 2009, and which claims the benefit of U.S. provisional patent application No. 61/078,640 filed on Jul. 7, 2008.

FIELD OF THE INVENTION

The present invention relates in general to wireless communication techniques and in particular to techniques of power savings in wireless systems.

BACKGROUND OF THE INVENTION

The following are some issues that exist with the power saving techniques employed in many current wireless systems, such as WiMAX or IEEE 802.16e systems.

In WiMAX and IEEE 802.16e systems, a mobile station may be placed in a power conserving state, such as sleep state or idle state. These states typically include windows/intervals of reduced communication ability to conserve power. However, in these systems, a mobile station (MS) in sleep state or idle state will miss, for example, the downlink channel descriptor/uplink channel descriptor (DCD/UCD) transmissions if it is in its sleep window (sleep state) or paging unavailable interval (idle state).

Typically in these systems, when an MS wakes up in a listening window (sleep state) or paging listening interval (idle state), if a system configuration change count has changed, indicating that the system configuration information currently stored by the mobile device is different than that currently in effect, the MS has to stay awake until proper reception of the next DCD/UCD transmission from a base station (BS).

The above issues can potentially incur unnecessary power consumption. In addition, they can potentially cause unnecessary delay for sleep-to-active and idle-to-active transition.

In some of these systems, the sleep window or paging unavailable interval can be quite large. During this time, the BS cannot transmit data to the MS and cannot trigger the MS to perform state transition to active state. To reduce state transition latency, the sleep window or paging unavailable interval can be set to a small value, however, at the expense of increased power consumption.

Also, in these systems there are typically a number of broadcast messages sent by the BS, e.g. DCD/UCD, MOB_NBR-ADV, MOB_SLP-RSP, MOB_PAG-ADV, FPC etc. However, some of this information may only be relevant to MSs in certain states (sleep, idle, normal), e.g. MOB_PAG-ADV is only relevant to MSs in idle state. However, in these systems the MS typically has no way to discern between messages before decoding them and therefore may have to decode all of the traffic bursts with Broadcast connection identifier (CID), thereby incurring unnecessary processing and power consumption at the MS.

SUMMARY

According to one broad aspect of the present invention, there is provided a method in a network node, the method comprising: transmitting an indication of a periodic interval at which system configuration information is to be transmitted; periodically transmitting a current version of system configuration information at the periodic interval; and in advance of an action time of a new version of system configuration information: periodically transmitting the new version of system configuration information at the periodic interval; and transmitting a flag indicating whether the new version of system configuration information is available.

In some embodiments, the method further comprises: transmitting a system configuration information presence indicator indicative of whether system configuration information is present including an indication of length and type of system configuration information; and transmitting a current system configuration information identifier indicative of the version of system configuration information currently in effect.

In some embodiments, periodically transmitting the new version of system configuration information at the periodic interval comprises periodically transmitting: the system configuration identifier for the new version of system configuration information; and the action time of the new version of system configuration information.

In some embodiments, transmitting the indication of the periodic interval at which system configuration information is to be transmitted, transmitting the flag indicating whether the new version of system configuration information is available, transmitting a system configuration information presence indicator and transmitting a current system configuration information identifier comprise broadcasting the indication of the periodic interval at which system configuration information is to be transmitted, the flag indicating whether the new version of system configuration information is available, the system configuration information presence indicator and the current system configuration information identifier in a broadcast channel.

In some embodiments, the method further comprises: after the action time of the new version of system configuration information, stopping transmission of the flag indicating the new version of system configuration information is available to indicate that a newer version of system configuration information is not yet available.

In some embodiments, the method further comprises: in respect of each of at least one mobile station in a power-saving state, in which the mobile station (MS) is configured on a per-MS basis to periodically wake up and check for the presence of an information block relevant to the MS, transmitting an information block presence indicator indicative of whether the information block is present.

In some embodiments, the information block presence indicator is transmitted as part of a broadcast channel in a superframe header together with the indication of the periodic interval at which system configuration information is to be transmitted and the flag indicating whether the new version of system configuration information is available.

In some embodiments, the MS is configured to wake up at a multiple N of the periodic interval at which system configuration information is to be transmitted, N≥1.

In some embodiments, transmitting an information block presence indicator indicative of whether the information block is present comprises at least one of: in respect of each of at least one MS in a sleep state, transmitting a traffic indication information block presence indicator indicative of whether a traffic indication information block (TFIB) is present; and in respect of each of at least one MS in an idle state, transmitting a paging information block presence indicator indicative of whether a paging indication information block (PGIB) is present.

In some embodiments, location and modulation and coding scheme (MCS) of the TFIB and PGIB are predefined.

According to another broad aspect of the present invention, there is provided a network node configured to implement the method as described above or below.

According to yet another broad aspect of the present invention, there is provided a method in a mobile station, the method comprising: in a power-saving state: periodically waking up; receiving an indication of a periodic interval at which system configuration information is to be transmitted; waking up at a multiple N of the periodic interval at which system configuration information is to be transmitted, N≥1; receiving a flag indicating whether a new version of system configuration information is available; and upon determining that a new version of system configuration information is available and has not been previously received, attempting to receive the new version of system configuration information.

In some embodiments, the method further comprises: receiving a system configuration information presence indicator indicative of whether system configuration information is present including an indication of length and type of system configuration information; and receiving a current system configuration information identifier indicative of the version of system configuration information currently in effect, wherein attempting to receive the new version of system configuration information comprises checking the system configuration information indicator and the current system configuration information identifier.

In some embodiments, system configuration information comprises a system configuration identifier indicative of the version of the system configuration information and an action time identifier identifying when the associated version of system configuration information will take effect; and determining that a new version of system configuration information is available and has not been previously received comprises: comparing the system configuration information identifier for the new version of system configuration information with the current system configuration information identifier for the version of system configuration information currently in effect and the system configuration information identifier for any previously received version of system configuration information.

In some embodiments, periodically waking up to receive: an indication of the periodic interval at which system configuration information is to be transmitted, a flag indicating whether a new version of system configuration information is available, a system configuration information presence indicator and a current system configuration information identifier comprises periodically waking up to receive a broadcast channel (BCH) containing the indication of the periodic interval at which system configuration information is to be transmitted, the flag indicating whether the new version of system configuration information is available, the system configuration information presence indicator and the current system configuration information identifier.

In some embodiments, periodically waking up to receive a broadcast channel comprises periodically waking up at a MS-specific interval to decode a superframe header containing the BCH.

In some embodiments, the method further comprises: in the power-saving state, periodically waking up to check for the presence of an information block presence indicator indicative of whether an information block relevant to the MS is present.

In some embodiments, the method further comprises receiving the information block presence indicator in a broadcast channel (BCH) in a superframe header together with the indication of the periodic interval at which system configuration information is to be transmitted and the flag indicating whether the new version of system configuration information is available.

In some embodiments, in the power-saving state, periodically waking up to check for the presence of an information block presence indicator indicative of whether an information block relevant to the MS is present comprises at least one of: in a sleep state, periodically waking up to check for the presence of a traffic indication information block presence indicator indicative of whether a traffic indication information block (TFIB) is present; and in an idle state, periodically waking up to check for the presence of a paging information block presence indicator indicative of whether a paging indication information block (PGIB) is present.

According to still another broad aspect of the present invention, there is provided a mobile station configured to implement the method described above or below.

According to a further broad aspect of the present invention, there is provided a method in a network node, the method comprising: in respect of each of at least one mobile station in a power-saving state, in which the mobile station (MS) is configured on a per-MS basis to periodically wake up and check for the presence of an information block relevant to the MS, transmitting an information block presence indicator indicative of whether the information block is present.

In some embodiments, the information block presence indicator is transmitted as part of a broadcast channel in a superframe header and the MS is configured to periodically wake up at a multiple N of superframes, N≥1.

In some embodiments, transmitting an information block presence indicator indicative of whether the information block is present comprises at least one of: in respect of each of at least one MS in a sleep state, transmitting a traffic indication information block presence indicator indicative of whether a traffic indication information block (TFIB) is present; and in respect of each of at least one MS in an idle state, transmitting a paging information block presence indicator indicative of whether a paging indication information block (PGIB) is present.

In some embodiments, location and modulation and coding scheme (MCS) of the TFIB and PGIB are predefined.

According to another broad aspect of the present invention, there is provided a method in a mobile station (MS), the method comprising: in a power-saving state, periodically waking up at a periodic interval configured on a per-MS basis; and checking for the presence of an information block presence indicator indicative of whether an information block relevant to the MS is present.

In some embodiments, the method further comprises receiving the information block presence indicator in a broadcast channel (BCH) in a superframe header, wherein periodically waking up at a periodic interval configured on a per-MS basis comprises periodically waking up at a multiple N of superframes, N≥1.

In some embodiments, in the power-saving state, periodically waking up at a periodic interval configured on a per-MS basis to check for the presence of an information block presence indicator indicative of whether an information block relevant to the MS is present comprises at least one of: in a sleep state, periodically waking up to check for the presence of a traffic indication information block presence indicator indicative of whether a traffic indication information block (TFIB) is present; and in an idle state, periodically waking up to check for the presence of a paging information block presence indicator indicative of whether a paging indication information block (PGIB) is present.

Other aspects and features of the present invention will become apparent, to those ordinarily skilled in the art, upon review of the following description of the specific embodiments of the invention.

BRIEF DESCRIPTION OF THE DRAWINGS

Embodiments of the present invention will now be described, by way of example only, with reference to the accompanying drawing figures, wherein.

Like reference numerals are used in different figures to denote similar elements.

DETAILED DESCRIPTION

Figure 1:
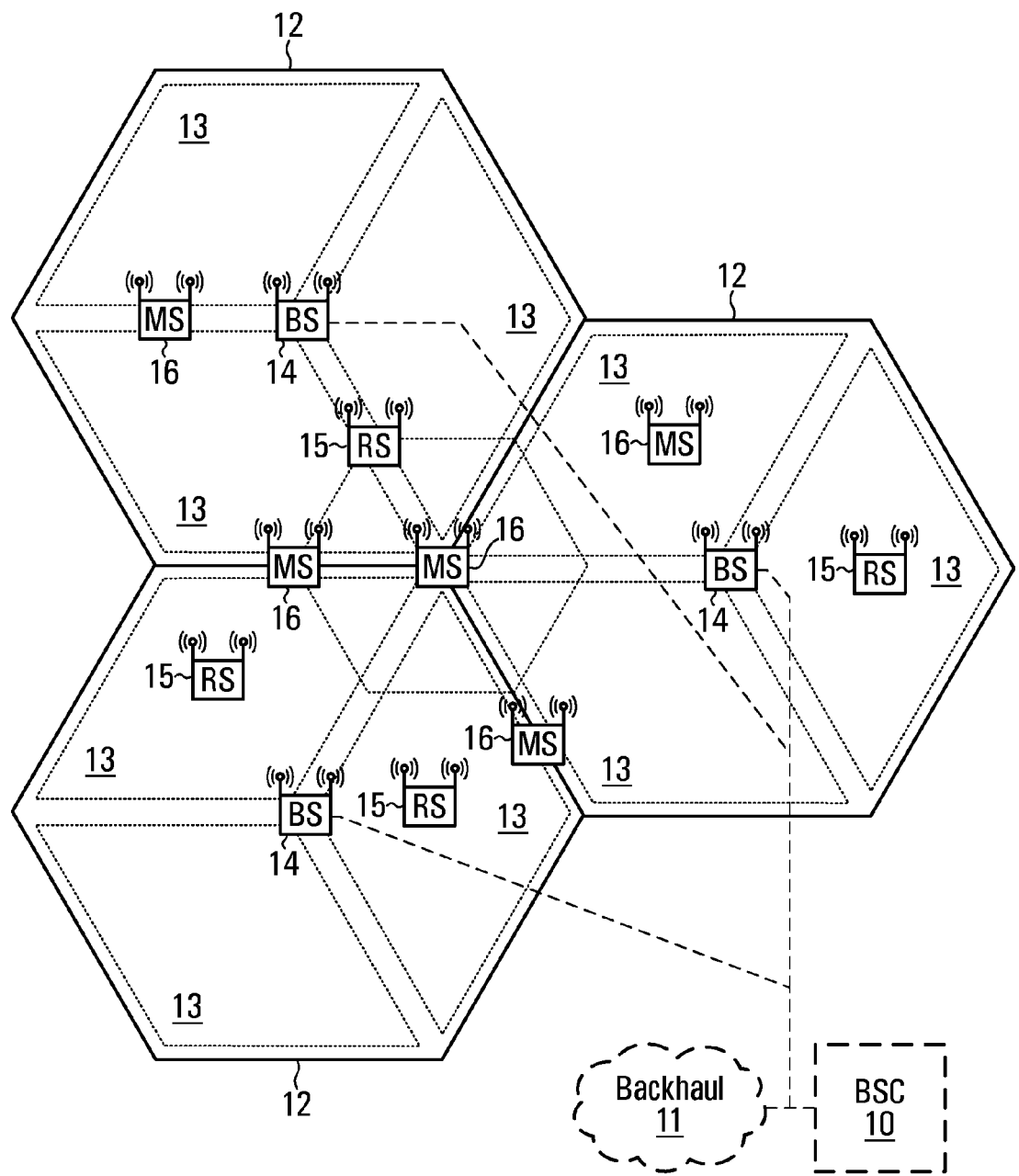
FIG. 1 is a block diagram of a cellular communication system.

In the following detailed description of sample embodiments, reference is made to the accompanying drawings, which form a part hereof, and in which is shown by way of illustration specific sample embodiments in which the present invention may be practised. These embodiments are described in sufficient detail to enable those skilled in the art to practice the invention, and it is to be understood that other embodiments may be utilized and that logical, mechanical, electrical, and other changes may be made without departing from the scope of the invention. The following detailed description is, therefore, not to be taken in a limiting sense, and the scope is defined by the appended claims.

Various methods for improving power saving efficiencies for mobile stations, while also providing fast transition of mobile stations from power-saving states, such as sleep state or idle state, back to active state are provided.

Some embodiments of the methods for power savings in mobile stations as described herein may address one or more of the following TGm SRD requirements set out in IEEE 802.16m-07/002r4:

Section 6.2.2 State transition latency:
As shown in Table 3, the maximum allowable IDLE to ACTIVE transition latency is 100 ms Section 6.10 System overhead:
"Overhead, including overhead for control signaling as well as overhead related to bearer data transfer, for all applications shall be reduced as far as feasible without compromising overall performance and ensuring proper support of systems features."

Section 6.11 Enhanced power saving:
"IEEE 802.16m shall provide support for enhanced power saving functionality to help reduce power consumption in devices for all services and applications."

Some embodiments of the present invention do away with the notion of the listening window defined for sleep state MSs in IEEE 802.16 and the notion of the paging listening interval defined for idle state MSs in IEEE 802.16.

In some embodiments, an MS in a power-saving state, such as sleep state or idle state, periodically wakes up to decode system configuration information and/or an information block presence indicator, i.e. a pointer, for an IB relevant to the MS, e.g. a traffic indication information block (TFIB) for a sleep state MS or a paging information block (PGIB) for an idle state MS. In this way, an MS in a power-saving state may only need to wake up for one sub-frame rather than the whole listening window (sleep state) or paging listening interval (idle state), as currently may occur in an IEEE 802.16e system.

In some embodiments, the BSs broadcast the period or superframe number(s) of the transmission of the system configuration information so that MSs in a power-saving state, such as sleep state or idle state can wake-up in time to decode the system configuration information, which can potentially expedite the transition back to active state when needed.

In some embodiments, in order to efficiently wake up an MS in sleep state, a BS periodically broadcasts a TFIB presence indicator, to indicate the presence of traffic indication information block (TFIB).

In some embodiments, the wake up instance of the MS coincides with the transmission of the TFIB presence indicator. If the TFIB presence indicator does not indicate presence of any TFIB relevant to the MS, the MS can go back to sleep.

In some embodiments, in order to efficiently wake up an MS in idle state, a BS periodically broadcasts a PGIB presence indicator, to indicate the presence of a PGIB that may be relevant to the MS. In some embodiments, the wake up instance of the MS coincides with the transmission of the PGIB presence indicator. If the PGIB presence indicator does not indicate presence of any PGIB that may be relevant to the MS, the MS can go back to sleep.

Reference will now be made to FIGS. 1-6, which illustrate various examples of networks, network nodes and mobile terminals in which embodiments of the present invention may be realized.

Referring first to FIG. 1, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications using OFDM with 20 mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. In 3 some configurations, relay stations 15 may assist in communications between base stations 14 and wireless terminals 16. Wireless terminals 16 can be handed off 18 from any cell 12, sector 13, zone (not shown), base station 14 or relay 15 to an other cell 12, sector 13, zone (not shown), base station 14 or relay 15. In some configurations, base stations 14 communicate with each and with another network (such as a core network or the internet, both not shown) over a backhaul network 11. In some configurations, a base station controller 10 is not needed.

Figure 2:
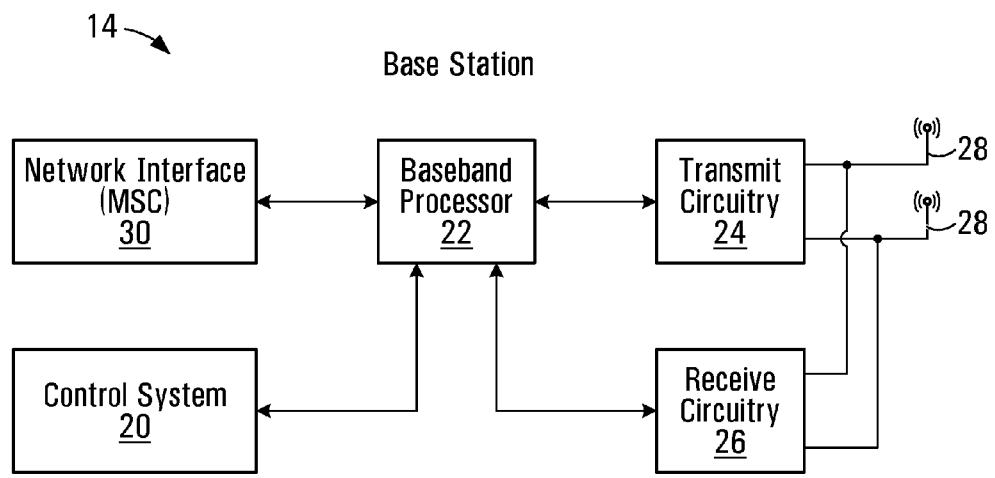
FIG. 2 is a block diagram of an example base station that might be used to implement some embodiments of the present invention.

With reference to FIG. 2, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated 20 circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
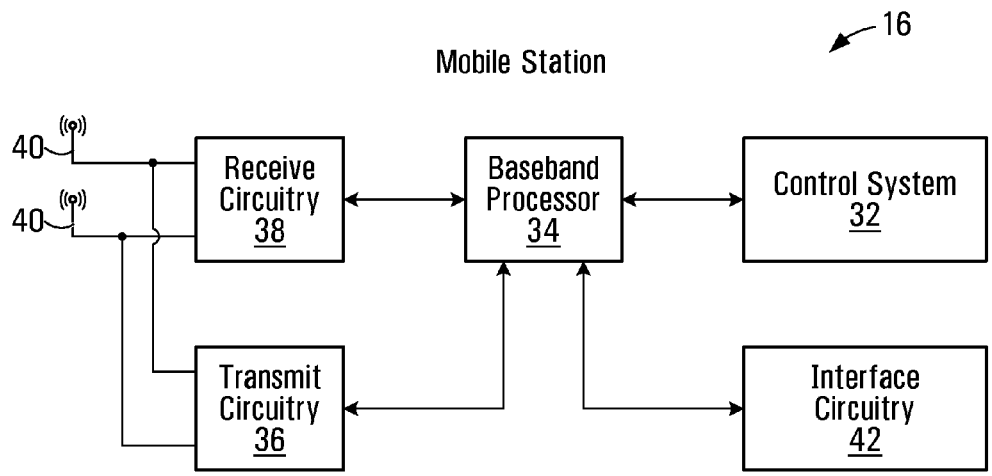
FIG. 3 is a block diagram of an example wireless terminal that might be used to implement some embodiments of the present invention.

With reference to FIG. 3, an example of a mobile terminal 16 is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for 20 transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 20 28 (n>=1), and each mobile terminal 16 is equipped with "m" receive antennas 40 (m>=1). Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 4:
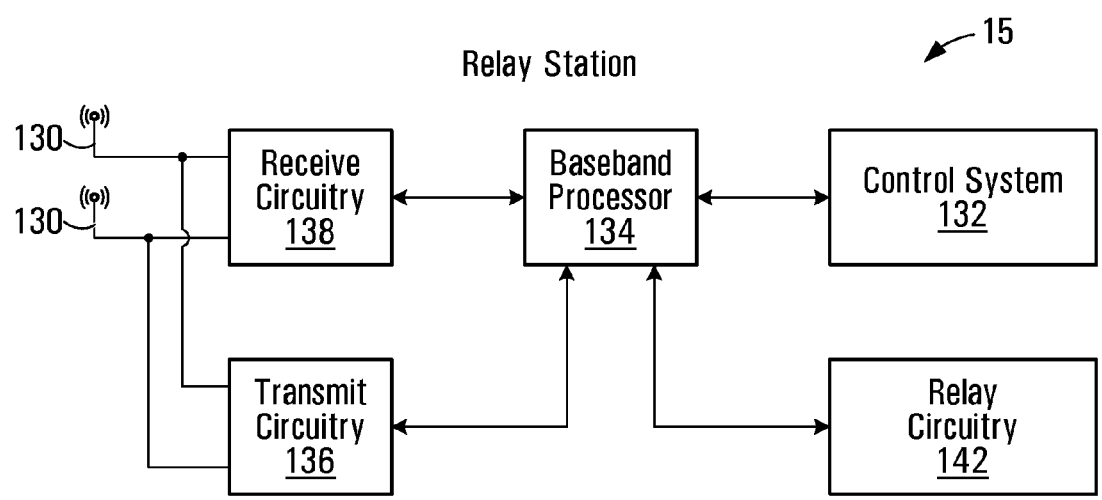
FIG. 4 is a block diagram of an example relay station that might be used to implement some embodiments of the present invention.

With reference to FIG. 4, an example of a relay station 15 is illustrated. Similarly to the base station 14, and the mobile terminal 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or 20 frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
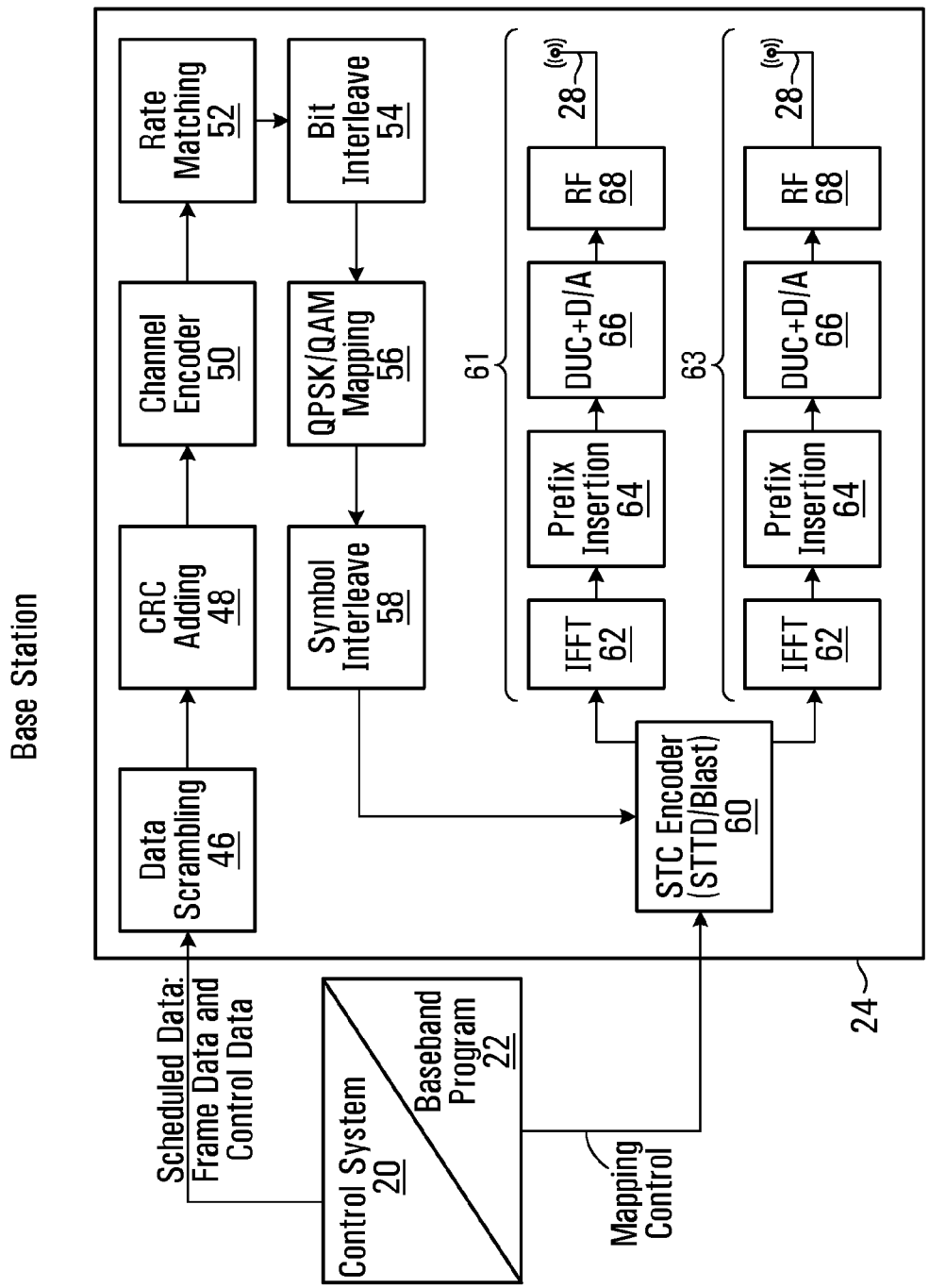
FIG. 5 is a block diagram of a logical breakdown of an example OFDM transmitter architecture that might be used to implement some embodiments of the present invention.

With reference to FIG. 5, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the 20 loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides 20 symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the 9 intended mobile terminal 16 are scattered among the sub-carriers. The mobile terminal 16, which is discussed in detail below, will use the pilot signals for channel estimation.

Figure 6:
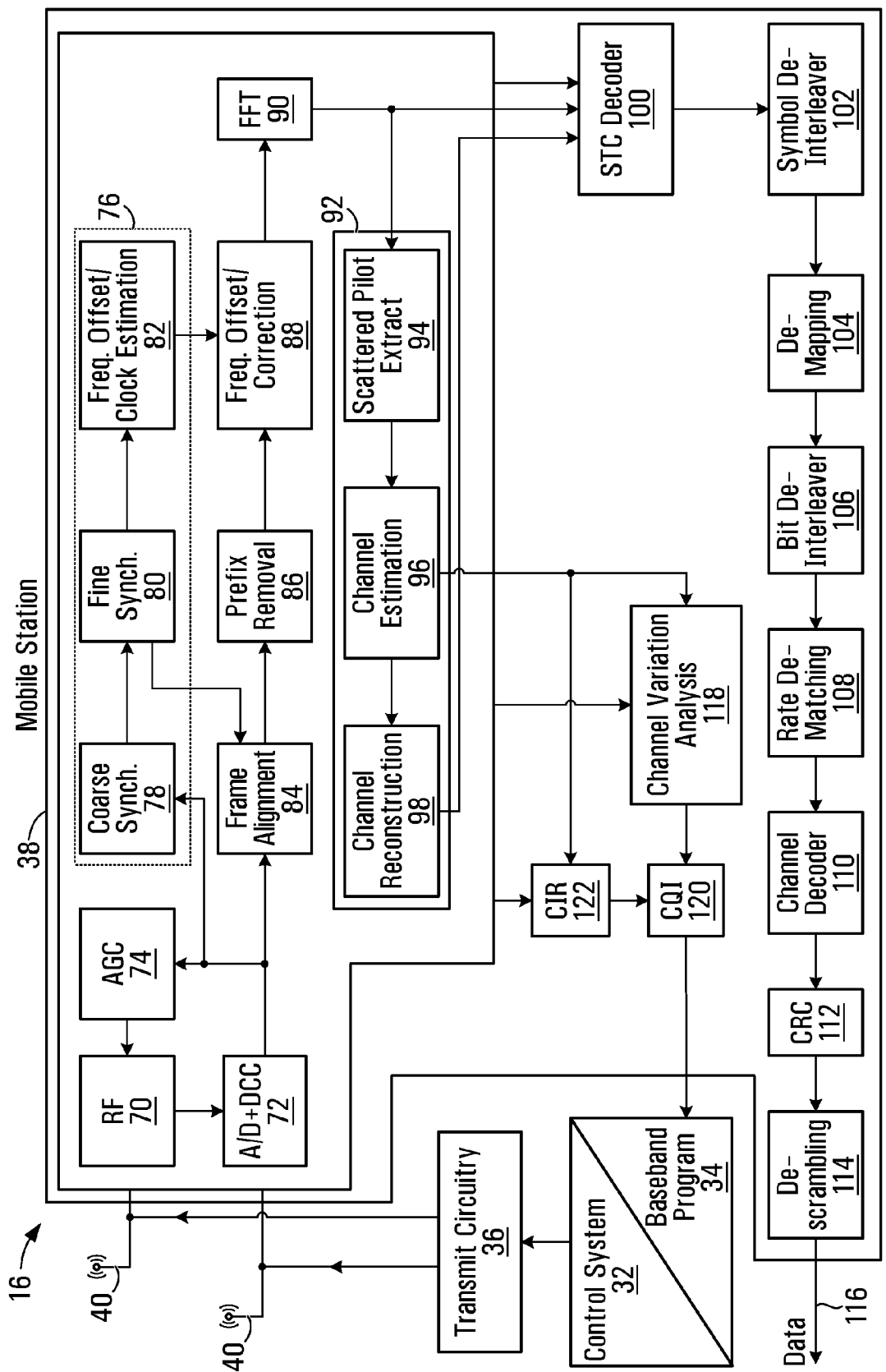
FIG. 6 is a block diagram of a logical breakdown of an example OFDM receiver architecture that might be used to implement some embodiments of the present invention.
Figure 7:
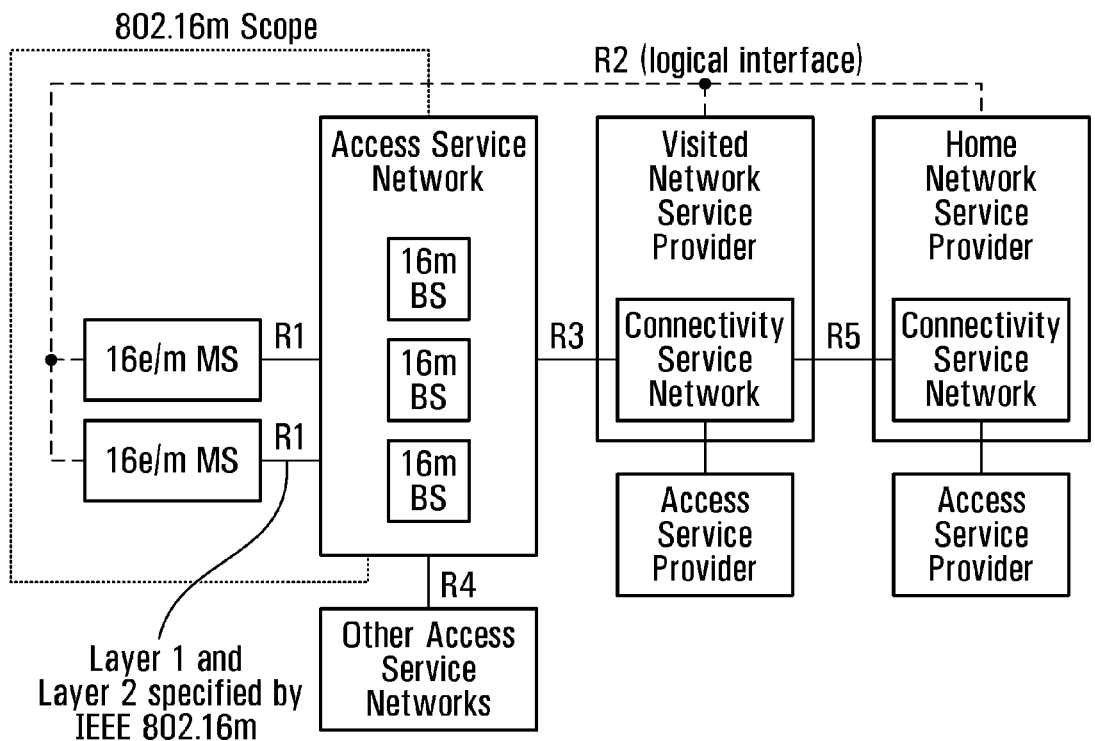
FIG. 7 is a schematic diagram of a network architecture implemented by the cellular communication system shown in FIG. 1 and corresponds to FIG. 1 of IEEE 802.16m-08/003r1.
Figure 8:
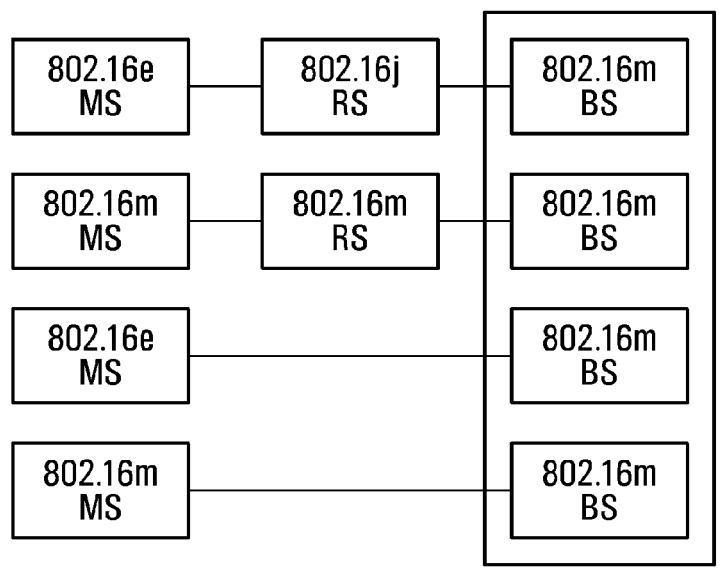
FIG. 8 is a schematic diagram of an architecture of the Relay Station shown in FIG. 4 and corresponds to FIG. 2 of IEEE 802.16m-08/003r1.
Figure 9:
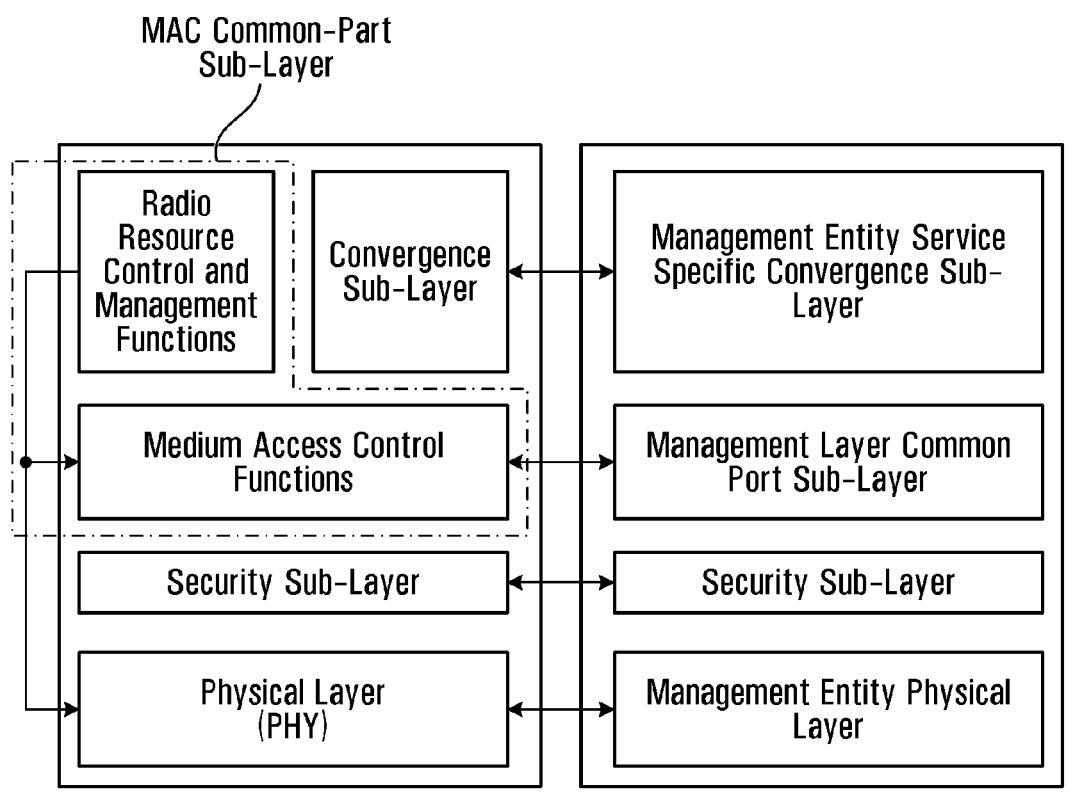
FIG. 9 is a schematic representation of a System Reference Model of the cellular communication system shown in FIG. 1 and corresponds to FIG. 3 of IEEE 802.16m-08/003r1.
Figure 10:
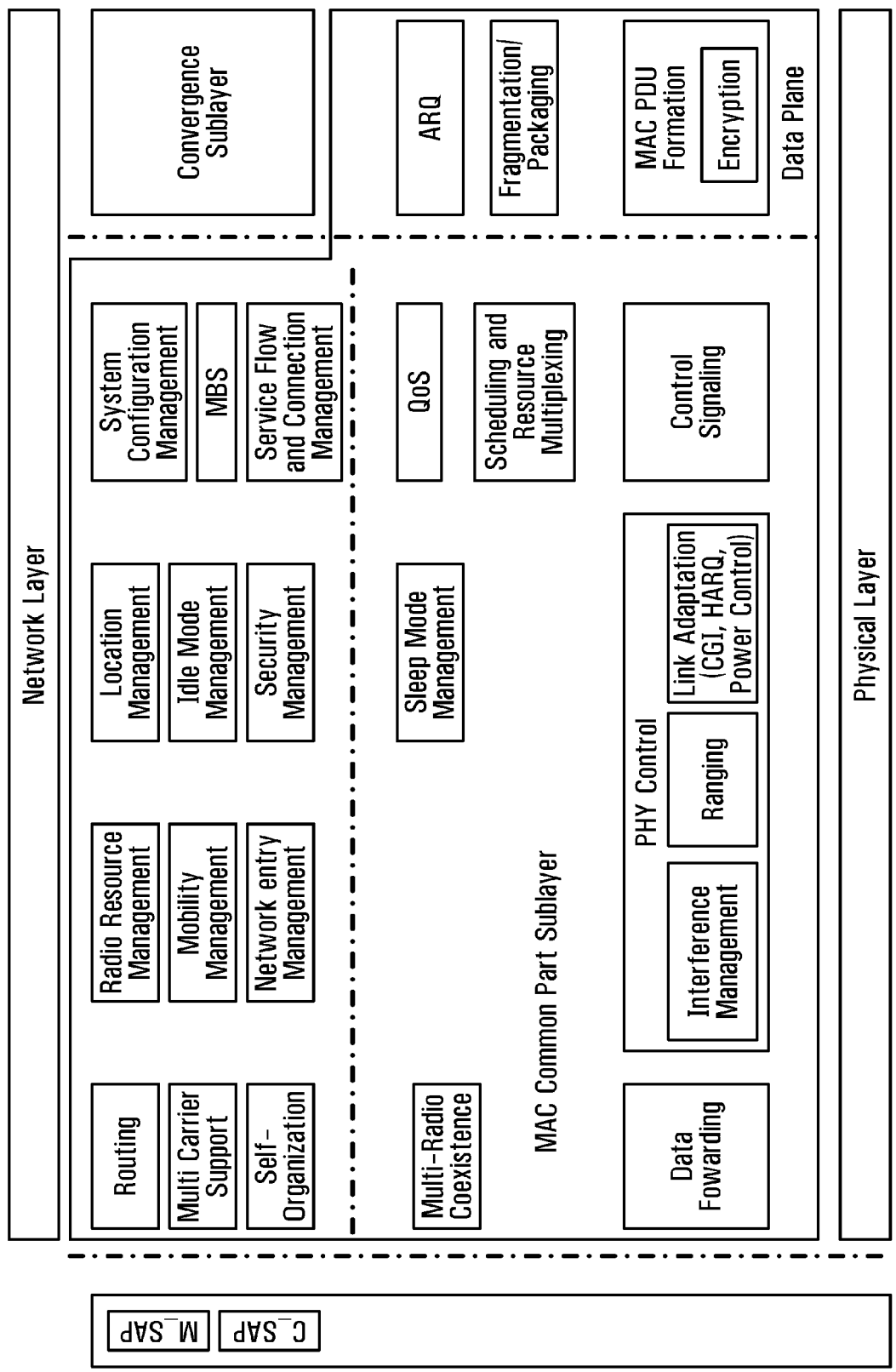
FIG. 10 is a schematic representation of a Protocol Structure in accordance with IEEE 802.16m and corresponds to FIG. 4 of IEEE 802.16m-08/003r1.
Figure 11:
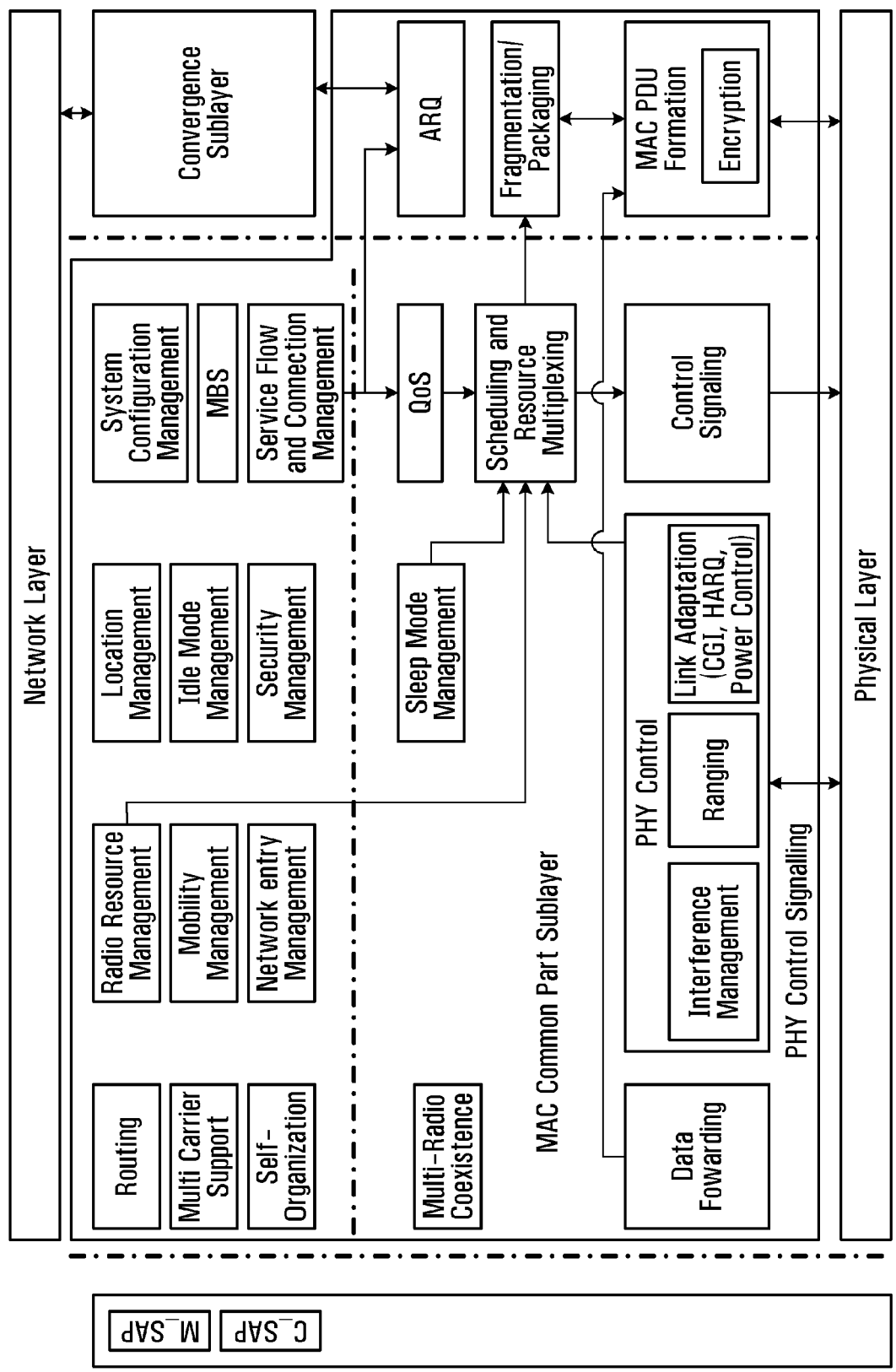
FIG. 11 is a Processing Flow diagram of a MS/BS Data Plane in accordance with IEEE 802.16m and corresponds to FIG. 5 of IEEE 802.16m-08/003r1.
Figure 12:
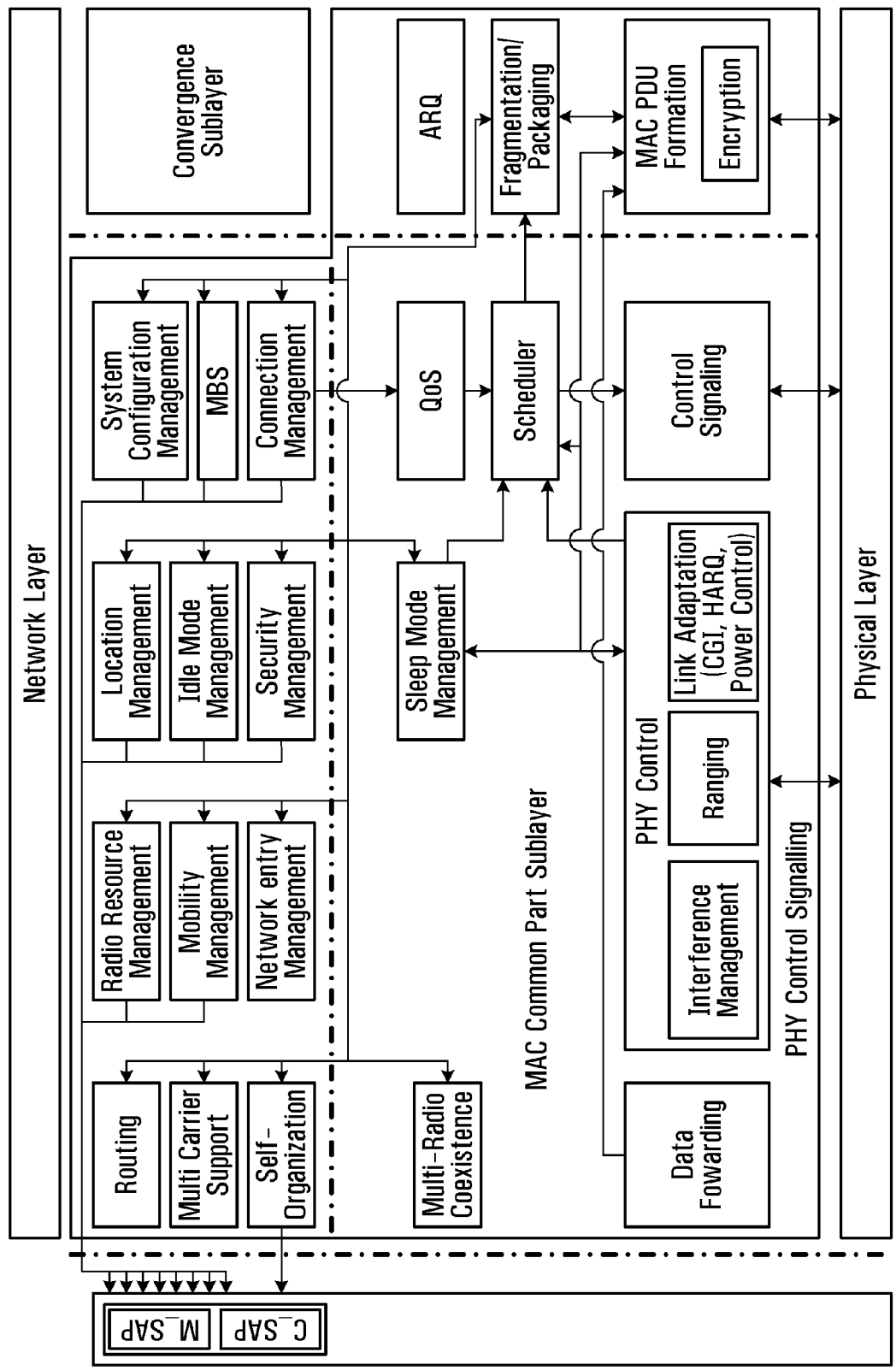
FIG. 12 is a Processing Flow diagram of the MS/BS Control Plane in accordance with IEEE 802.16m and corresponds to FIG. 6 of IEEE 802.16m-08/003r1.
Figure 13:
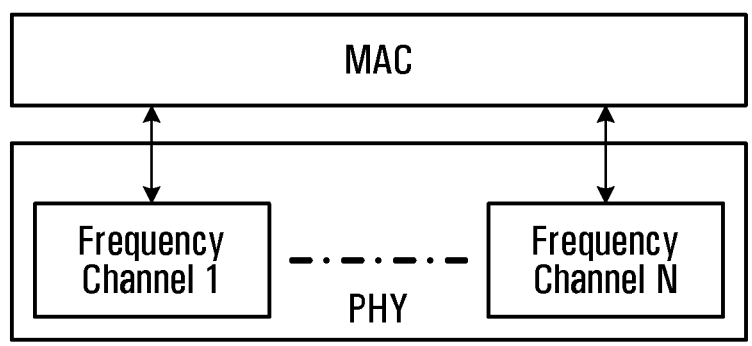
FIG. 13 is a schematic representation of a Generic protocol architecture to support a multicarrier system and corresponds to FIG. 7 of IEEE 802.16m-08/003r1.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing.

The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is 20 based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel 20 reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for descrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

In some embodiments, a relay station may operate in a time division manner using only one radio, or alternatively include multiple radios.

In some embodiments, SC-FDMA (Single-Carrier Frequency Division Multiple Access) is used. SC-FDMA is a modulation and multiple access scheme introduced for the uplink of 3GPP Long Term Evolution (LTE) broadband wireless fourth generation (4G) air interface standards, and the like. SC-FDMA can be viewed as a DFT pre-coded OFDMA scheme, or, it can be viewed as a single carrier (SC) multiple access scheme.

FIGS. 1 to 6 provide specific examples of communication systems and components thereof that could be used to implement some embodiments of the present invention. It is to be understood that embodiments of the present invention can be implemented with communications systems having architectures that are different than the specific examples discussed above, but that operate in a manner consistent with the implementation of the embodiments as described herein.

FIGS. 7 to 13 correspond to FIGS. 1 to 7 of IEEE 802.16m-08/003r1. The description of the corresponding figures in IEEE 802.16m-08/003r1 is incorporated herein by reference.

For illustrative purposes, embodiments of the present invention related to modifications to IEEE 802.16m system protocols will now be discussed with reference to FIG. 14. These examples are provided for illustrative purposes only and are not to be considered limiting.

More generalized embodiments of the present invention are described later with reference to FIGS. 15 to 18.

Efficient Transmission of Extended System Configuration Information

In some systems, such as IEEE 802.16m, the superframe header (SFH) contains a broadcast channel (BCH) which carries the essential system configuration information (ESCI). However, the mapping to physical channel/location and transmission frequency of additional extended system configuration information (EXSCI) may not be defined.

In some embodiments, the following information is included in the BCH contained in the superframe header to enable efficient detection of the EXSCI and power saving for users in active, sleep and idle states:

Period ($P_{EXSCI}$) of the EXSCI broadcast: the EXSCI is broadcast at the superframe number N, where (N mod $P_{EXSCI}$) equals to zero;

EXSCI presence indicator (EPI): to indicate the presence of EXSCI, including the length and type;

EXSCI version number (EVN): version number of the system configuration currently in effect;

New EXSCI broadcast alert (NEBA): a flag to indicate if BS has broadcast a newer version of the EXSCI than the one currently in effect;

Traffic indication information block (TFIB) presence indicator (TPI): to indicate the presence of TFIB, including the length; and Paging information block (PGIB) presence indicator (PPI): to indicate the presence of PGIB, including the length.

In some embodiments, the following information is included in the EXSCI:

EXSCI version number (EVN); and

Action time indicator: to indicate when the associated configuration will take effect.

Example details of how the above parameters may apply to users in active, sleep and idle states are described later.

Figure 14:
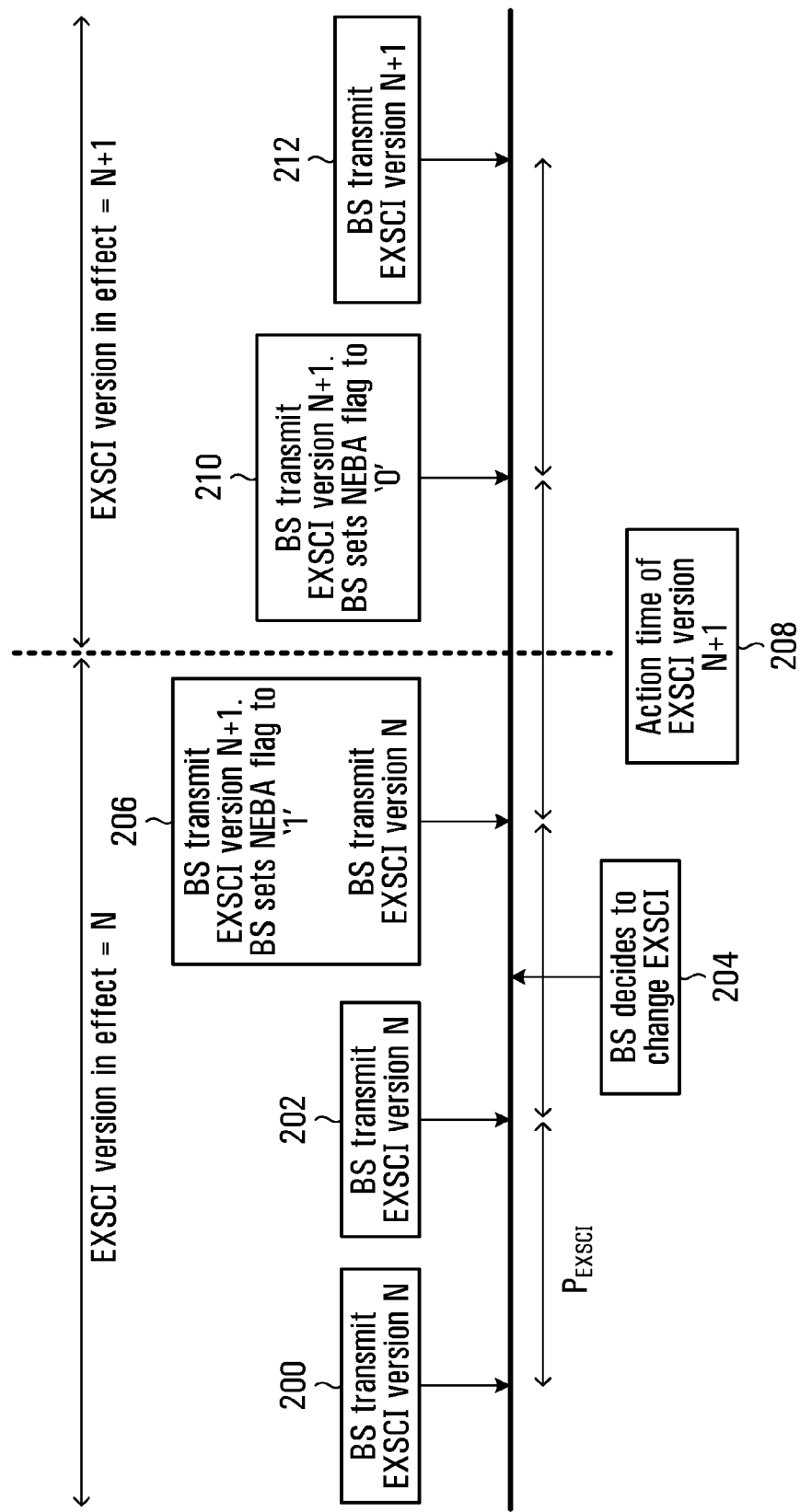
FIG. 14 is a timing diagram illustrating the transmission of system control information in accordance with an embodiment of the present invention.

FIG. 14 is an example timeline for broadcast transmission of system configuration information, such as EXSCI, from a network node, such as a base station, to a mobile station in accordance with an embodiment of the present invention. In particular, the timeline illustrates the periodic broadcast transmission of EXSCI at a periodic interval $P_{EXSCI}$, the value of which is broadcast to the MS, so that the MS knows when to wake up to look for EXSCI.

The timeline illustrated in FIG. 14 is divided into to portions. To the left is an interval in which a current EXSCI version N is in effect. To the right is an interval in which a new EXSCI version N+1 is in effect. These intervals are divided by an action time 208 at which the new EXSCI version N+1 comes into effect.

In the time prior to action time 208, the BS periodically transmits the current version N of EXSCI at 200 and 202 in accordance with the periodic interval $P_{EXSCI}$, which, in some embodiments, may be broadcast in the $P_{EXSCI}$ field in the BCH contained in the superframe header, as noted above.

When the BS intends to change the EXSCI at 204, it again transmits the current version N of EXSCI at 206 following the periodic interval $P_{EXSCI}$, but also begins periodically broadcasting the new version N+1 of EXSCI at 206. The BS also sets a flag, such as the NEBA flag described above, to indicate that a new version of EXSCI is available. In some embodiments, this involves setting the NEBA flag field to '1' in BCH so that an MS knows that it should attempt to decode the new version of EXSCI.

The periodic transmission of current version N and new version N+1 of EXSCI, as shown at 206 in FIG. 14, allows an MS in a power-saving state, such as sleep state or idle state to receive the information even if it misses an initial broadcast of EXSCI. While FIG. 14 only shows a single instance 206 prior to action time 208 in which both the current and the next version of EXSCI are transmitted with the flag set to indicate that a new version of EXSCI is available, more generally such information may be broadcast any number of times prior to an action time in which a new version of system configuration information comes into effect.

After action time 208, the BS continues to periodically transmit the new version N+1 of EXSCI at 210 and 212, but at 210 sets the NEBA flag to '0', which in the illustrated embodiment indicates a newer version of EXCSI is not available.

In some embodiments, in addition to periodically broadcasting the EXSCI, the EXSCI is also unicast to an MS performing network entry/re-entry.

In some embodiments, a BS can send additional aperiodic EXSCI on as-needed basis, which is implementation dependent, to expedite the detection of the information by MSs in sleep state and idle state. For example, in some embodiments, a BS may transmit the EXSCI at the wake up time of an MS.

Power Saving Modes

A brief description of the power saving modes that have been proposed for IEEE 802.16m is provided below. Similar power saving schemes are proposed or implemented in many wireless communication systems, and one of ordinary skill in the art will appreciate that embodiments of the present invention are not limited to the specific scheme described here.

The following power-saving states have been proposed for 802.16m:

Active state: this state is for MS that has DL and/or UL traffic;

Sleep state: this mode is for MS that does not have DL or UL traffic. It enables fast transition back to active state; and Idle state: this is for MS that does not have DL or UL traffic. It has slower state transition back to active state than sleep state.

The Active state is further divided into two categories:

Fully active state: an MS in this state decodes the control information in each sub-frame; and Intermittently active state: an MS in this state decodes the control information on preconfigured sub-frame(s) or Hybrid Automatic Repeat Request (HARQ) interlace(s).

In some embodiments, while in either of the above active states, an MS decodes the BCH in the SFH and the EXSCI if present as indicated by the EPI in the BCH.

Embodiments of the present invention applicable to MSs in the foregoing IEEE 802.16m sleep state or idle state will now be described.

Sleep State

An MS in sleep state wakes up periodically to decode the SFH. The period is configured by the BS on a per-MS basis. In some embodiments, in addition to the foregoing, the MS also wakes up on the superframe where the BS broadcast the system configuration information, e.g. EXSCI; that is, the MS also wake up at the superframe number N, where (N mod $P_{EXSCI}$) equals to zero.

In some embodiments, a sleep state traffic indication information block (TFIB) is used to indicate to one or multiple MSs to transition back to active state.

In some embodiment, the presence (and length) of TFIB is indicated in the BCH by the TFIB presence indicator (TPI) field discussed earlier.

In some embodiments, when the MS wakes up periodically to decode the SFH (BCH), and if the TPI indicates the presence of TFIB, the MS shall decode the TFIB. If the TFIB includes the MS' user ID, then the MS shall transition to active state.

In some embodiments, the location and modulation and coding scheme (MCS) of TFIB is predefined, e.g., in some embodiments, TFIB follows the EXSCI if present.

Since an MS only needs to decode the SFH when it wakes up periodically, rather than decoding all the sub-frames (and all the broadcast messages) within a listening window as in the case of legacy IEEE 802.16e systems, in some embodiments, an MS can be configured to wake-up more frequently than that of the legacy system, while allowing power saving as well as relatively fast state transition.

Sleep State—Efficient Decoding of EXSCI Update

When a MS wakes up at $P_{EXSCI}$ intervals, such as at 200, 202, 206, 210 and 212 shown in FIG. 14, to decode the SFH (BCH), the MS reads the EVN, NEBA, EPI fields in the BCH.

In some embodiments, if the MS detects that a current system configuration information indicator, such as the EVN field in BCH described earlier, has not changed from what the MS has stored and the NEBA flag is set to indicate that a new version of EXSCI is not being transmitted, e.g. NEBA flag is set to '0', the MS does not need to decode the EXSCI. Instants 200, 202 and 212 shown in FIG. 14 are examples of such a circumstance.

In some embodiments, if the MS detects that EVN has not changed from what the MS has stored, but NEBA is set to indicate that a new version of EXSCI is being transmitted, e.g. NEBA is set to '1', and the MS has not previously received the new version of EXSCI from the BS, the MS shall decode the EXSCI pointed to by the system configuration information presence indicator, such as the pointer in the EPI field in the BCH described above. Instant 206 shown in FIG. 14 is an example of such a circumstance.

In some embodiments, if the MS fails to decode EXSCI in a current superframe, the MS shall stay awake to decode SFHs/EXSCI of a subsequent superframe.

In some embodiments, if MS fails to decode EXSCI after a pre-defined number of trials, the MS shall perform network re-entry.

In some embodiments, if the MS detects that the current system configuration information identifier, e.g. EVN, has not changed from what the MS has stored, but the NEBA flag is set to indicate that a new version of EXSCI is being transmitted, e.g. NEBA set to '1', and the MS has previously received the new version of EXSCI from the BS, the MS does not need to decode the EXSCI and may not do so.

Idle State

An MS in idle state wakes up periodically to decode the SFH. The period is configured by the BS on a per-MS basis. In addition, the MS also wakes up on the superframe where the BS broadcast the EXSCI, i.e., at the superframe number N, where (N mod $P_{EXSCI}$) equals zero.

In some embodiments, a paging information block (PGIB) is used to page one or multiple MSs to transition back to active state.

In some embodiments, the presence and length of PGIB is indicated in the BCH by the PPI field.

In some embodiments, when the MS wakes up periodically to decode the SFH (BCH), and if the PPI indicates the presence of PGIB, the MS shall decode the PGIB.

In some embodiments, if the PGIB includes the MS' user ID and other paging information, then the MS shall transition to active state and proceed with a subsequent network re-entry procedure.

In some embodiments, the location and MCS of PGIB is predefined. In some embodiments, the PGIB follows the EXSCI and TFIB if present.

Since an MS only needs to decode the SFH when it wakes up periodically, rather than decoding all the sub-frames (and the all the broadcast messages) within a paging listening window as in the case of the legacy system, in some embodiments an MS can be configured to wake-up more frequently than that of the legacy system, while allowing power saving as well as relatively fast state transition.

Idle State—Efficient Decoding of EXSCI Update

The system configuration update procedure for an idle state MS is similar to an MS in sleep state described earlier.

When MS wakes up at $P_{EXSCI}$ intervals to decode the SFH (BCH), it reads the EVN, NEBA, EPI fields in the BCH.

In some embodiments, if the MS detects that EVN has not changed from what the MS has stored and NEBA is set to indicate a new version of EXSCI is being transmitted, e.g. NEBA set to '0', the MS does not need to decode the EXSCI.

In some embodiments, if the MS detects that EVN has not changed from what the MS has stored, but NEBA is set to indicate a new version of EXSCI is being transmitted, e.g. NEBA set to '1', and the MS has not previously received the new version of EXSCI from the BS, the MS shall decode the EXSCI pointed by the EPI.

In some embodiments, if MS fails to decode EXSCI in a current superframe, the MS shall stay awake to decode SFHs/EXSCI of a sub-sequent superframe.

In some embodiments, If MS fails to decode EXSCI after a pre-defined number of trials, the MS shall perform network re-entry.

In some embodiments, —If the MS detects that EVN has not changed from what the MS has stored, but NEBA is set to indicate a new version of EXSCI is being transmitted, e.g. NEBA is set to '1', and the MS has previously received the new version of EXSCI from the BS, the MS does not need to decode the EXSCI.

The foregoing examples describe particular embodiments relating to IEEE 802.16m systems and modifications thereof. More generalized examples of embodiments of the present invention will now be described with reference to FIGS. 15 to 18.

Figure 15:
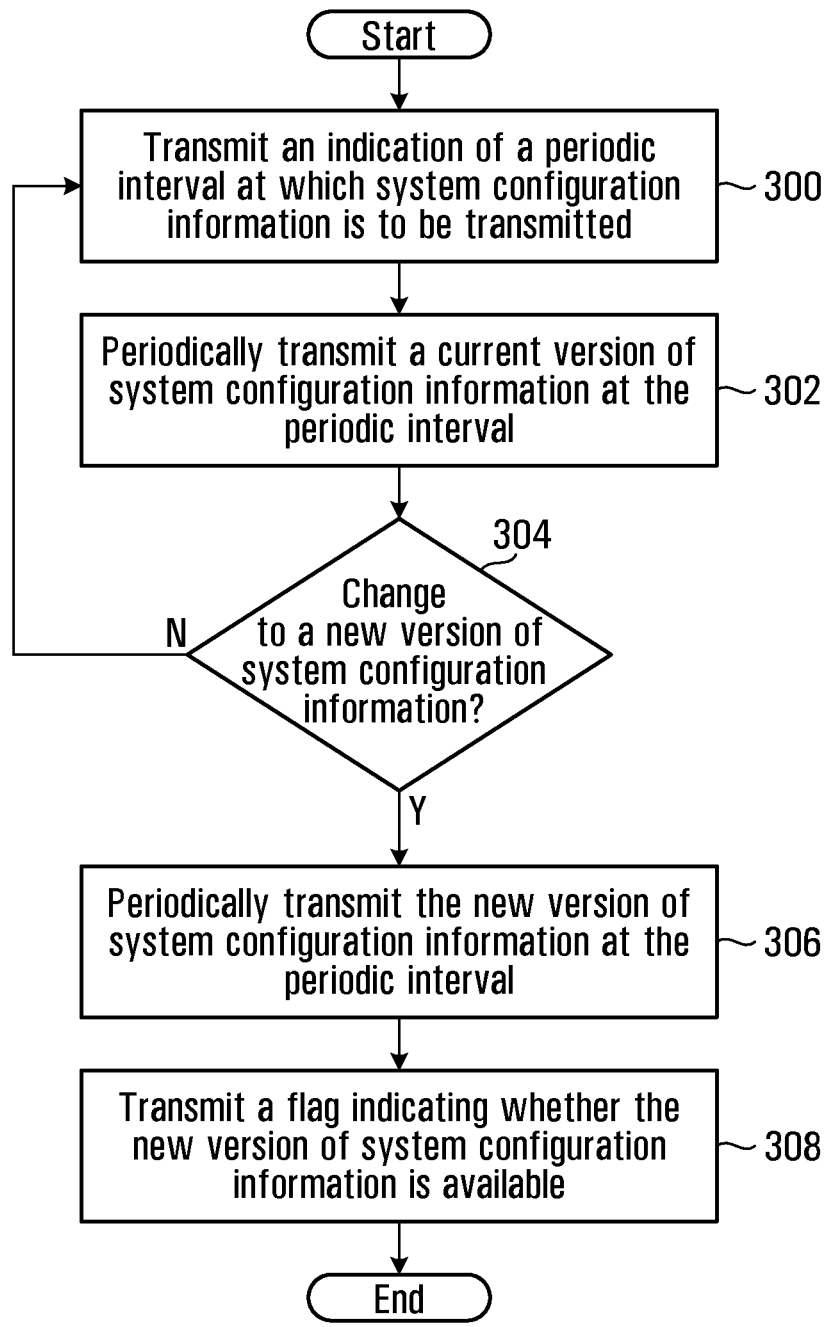
FIG. 15 is a flowchart of a method in a network node for transmission of system control information in accordance with an embodiment of the present invention.

FIG. 15 is a flowchart of a method in a network node for transmission of system control information in accordance with an embodiment of the present invention.

The method illustrated in the flowchart of FIG. 15 begins at block 300, in which the network node transmits an indication of a periodic interval at which system configuration information is to be transmitted. The periodic interval $P_{EXSCI}$ is an example of such a periodic interval.

In block 302, the network node periodically transmits a current version of system configuration information at the periodic interval.

In block 304, if it is determined that a change to a new version of system configuration information is to be made; i.e. 'yes' path from block 304, then in block 306, the network node periodically transmits the new version of system configuration information at the periodic interval and the method proceeds to block 308, in which the network node transmits, in advance of the action time of the new version of system configuration information, a flag indicating that the new version of system configuration information is available.

If it is determined at block 304 that there is to be no change from the current version of system configuration information; i.e. 'no' path from block 304, then the method returns to block 300.

In some embodiments, the method shown in FIG. 15 further comprises transmitting a system configuration information presence indicator, such as the EPI described earlier, which indicates whether system configuration information is present including an indication of length and type of system configuration information.

In some embodiments, the method further comprises transmitting a current system configuration information identifier, such as the EVN described earlier, which indicates the version of system configuration information currently in effect.

In some embodiments, periodically transmitting the new version of system configuration information at the periodic interval in block 306 comprises periodically transmitting the system configuration identifier for the new version of system configuration information and the action time of the new version of system configuration information.

In some embodiments, transmitting the indication of the periodic interval at which system configuration information is to be transmitted in block 300, transmitting the flag indicating whether the new version of system configuration information is available in block 308, transmitting a system configuration information presence indicator and transmitting a current system configuration information identifier, as described above, comprise broadcasting said information in a broadcast channel.

In some embodiments, after the action time of the new version of system configuration information, transmission of the flag indicating the new version of system configuration information is available is stopped, e.g. set to '0', to indicate that a newer version of system configuration information is not yet available.

In some embodiments, the method further includes transmitting, in respect of each of at least one mobile station in a power-saving state, in which the mobile station (MS) is configured on a per-MS basis to periodically wake up and check for the presence of an information block relevant to the MS, an information block presence indicator indicative of whether an information block relevant to the MS is present. Details of another embodiment including such a feature are described later with reference to FIG. 17.

Figure 16:
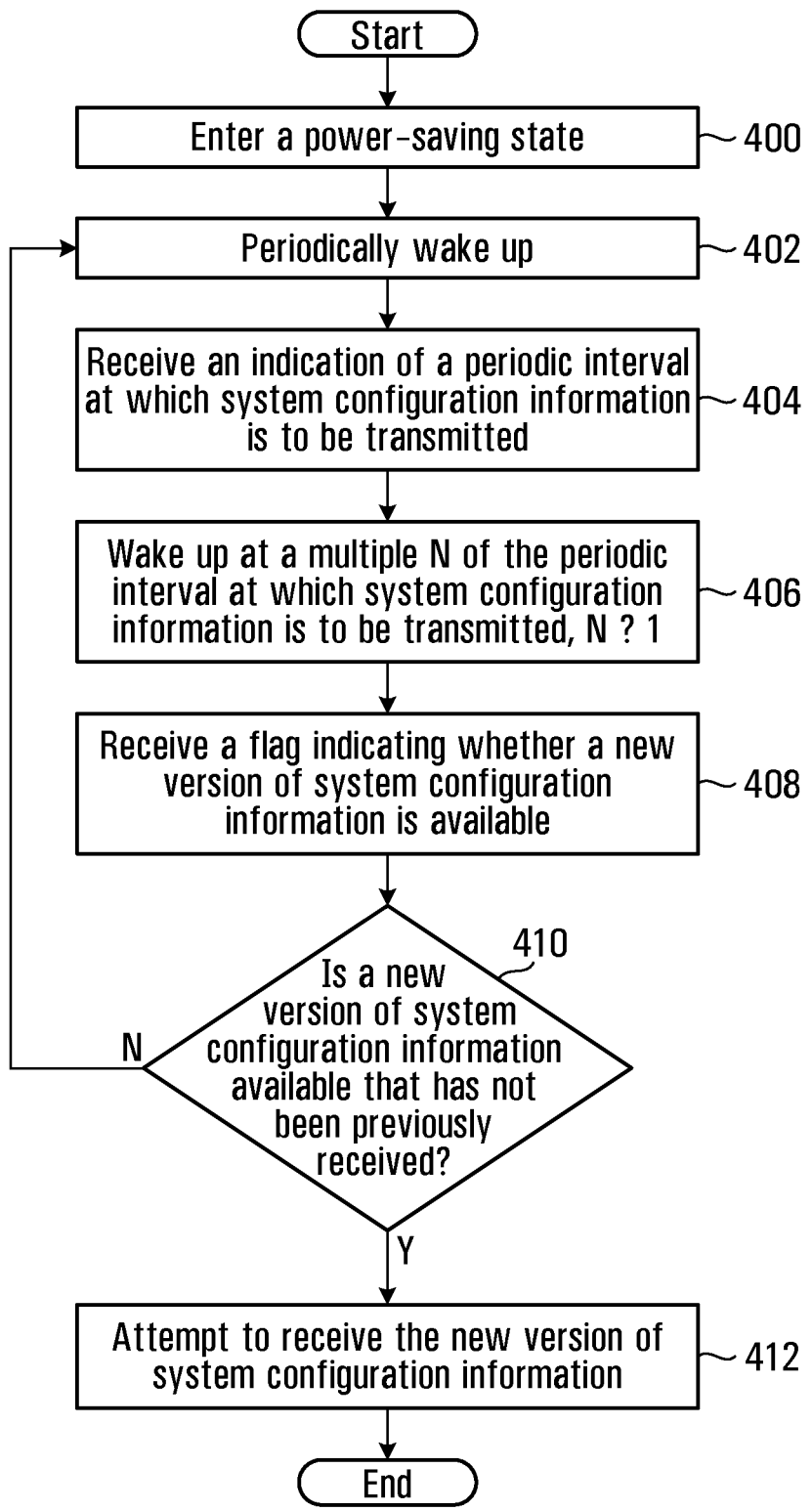
FIG. 16 is a flowchart of a method in a mobile station for receiving system control information updates in accordance with an embodiment of the present invention.

FIG. 16 is a flowchart of a method in a mobile station for receiving system control information updates in accordance with an embodiment of the present invention.

The method illustrated in the flowchart of FIG. 16 begins at block 400, in which the mobile station enters a power-saving state, such as sleep state or idle state.

Block 402 indicates that the mobile station periodically wakes up and the method proceeds to block 404 in which the MS receives an indication of a periodic interval at which system configuration information is to be transmitted.

In block 406, the MS wakes up at a multiple N of the periodic interval at which system configuration information is to be transmitted, N≥1, and the method proceeds to block 408, in which the MS receives a flag indicating whether a new version of system configuration information is available.

Based at least in part on the flag received in block 408, in block 410 the MS determines if a new version of system configuration information is available that has not been previously received. If yes; 'yes' path from block 410, the method proceeds to block 412 and the MS attempts to receive the new version of system configuration information. If no; 'no' path from block 410, the method returns to block 402 in which the MS resumes its periodic waking in the power-saving state.

In some embodiments, the method further comprises receiving a system configuration information presence indicator indicative of whether system configuration information is present including an indication of length and type of system configuration information and receiving a current system configuration information identifier indicative of the version of system configuration information currently in effect in block 408, In some embodiments, determining in step 410 if a new version of system configuration information is available that has not been previously received is based at least in part on the flag, the system configuration information presence indicator and the current system configuration information identifier.

In some embodiments, attempting to receive the new version of system configuration information in block 412 comprises checking the system configuration information indicator and the current system configuration information identifier.

In some embodiments, system configuration information comprises a system configuration identifier indicative of the version of the system configuration information and an action time identifier identifying when the associated version of system configuration information will take effect.

In some embodiments, determining that a new version of system configuration information is available and has not been previously received in block 410 comprises comparing the system configuration information identifier for the new version of system configuration information with the current system configuration information identifier for the version of system configuration information currently in effect and the system configuration information identifier for any previously received version of system configuration information.

In some embodiments, the receiving steps of blocks 404 and 408 comprise periodically waking up to receive a broadcast channel (BCH) containing the indication of the periodic interval at which system configuration information is to be transmitted and the flag indicating whether the new version of system configuration information is available.

In some embodiments, periodically waking up to receive a broadcast channel comprises periodically waking up at a MS-specific interval to decode a superframe header containing the BCH.

In some embodiments, when periodically waking up in block 402, the mobile station checks for the presence of an information block presence indicator indicative of whether an information block relevant to the MS is present. Details of another embodiment including such a feature are described later with reference to FIG. 18.

Figure 17:
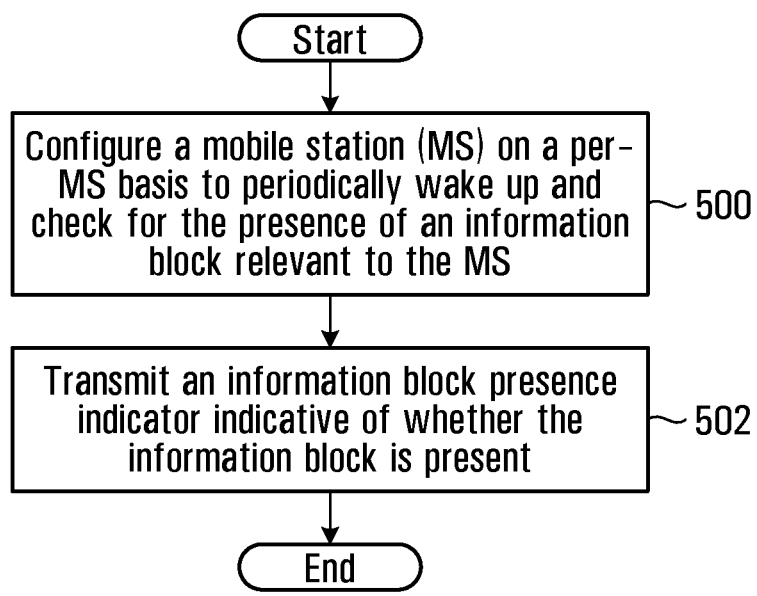
FIG. 17 is a flowchart of a method in a network node for transmission of an information block presence indicator in accordance with an embodiment of the present invention.

FIG. 17 is a flowchart of a method in a network node for transmission of an information block presence indicator in accordance with an embodiment of the present invention.

The method illustrated in the flowchart of FIG. 17 begins at block 500, in which, for each of at least one mobile station in a power-saving state, the network node configures the mobile station on a per-MS basis to periodically wake up and check for the presence of an information block relevant to the MS.

In block 502, the network node transmits an information block presence indicator indicative of whether the information block is present.

In some embodiments, the information block presence indicator is transmitted as part of a broadcast channel in a superframe header and the MS is configured to periodically wake up at a multiple N of superframes, N≥1.

In some embodiments, transmitting an information block presence indicator indicative of whether the information block is present in block 502 comprises at least one of:

A) in respect of each of at least one MS in a sleep state, transmitting a traffic indication information block presence indicator indicative of whether a traffic indication information block (TFIB) is present; and B) in respect of each of at least one MS in an idle state, transmitting a paging information block presence indicator indicative of whether a paging indication information block (PGIB) is present.

In some embodiments, the location and modulation and coding scheme (MCS) of the TFIB and PGIB are predefined; e.g. the TFIB may follow the system configuration information (if present) and the PGIB may follow the TFIB (if present).

Figure 18:
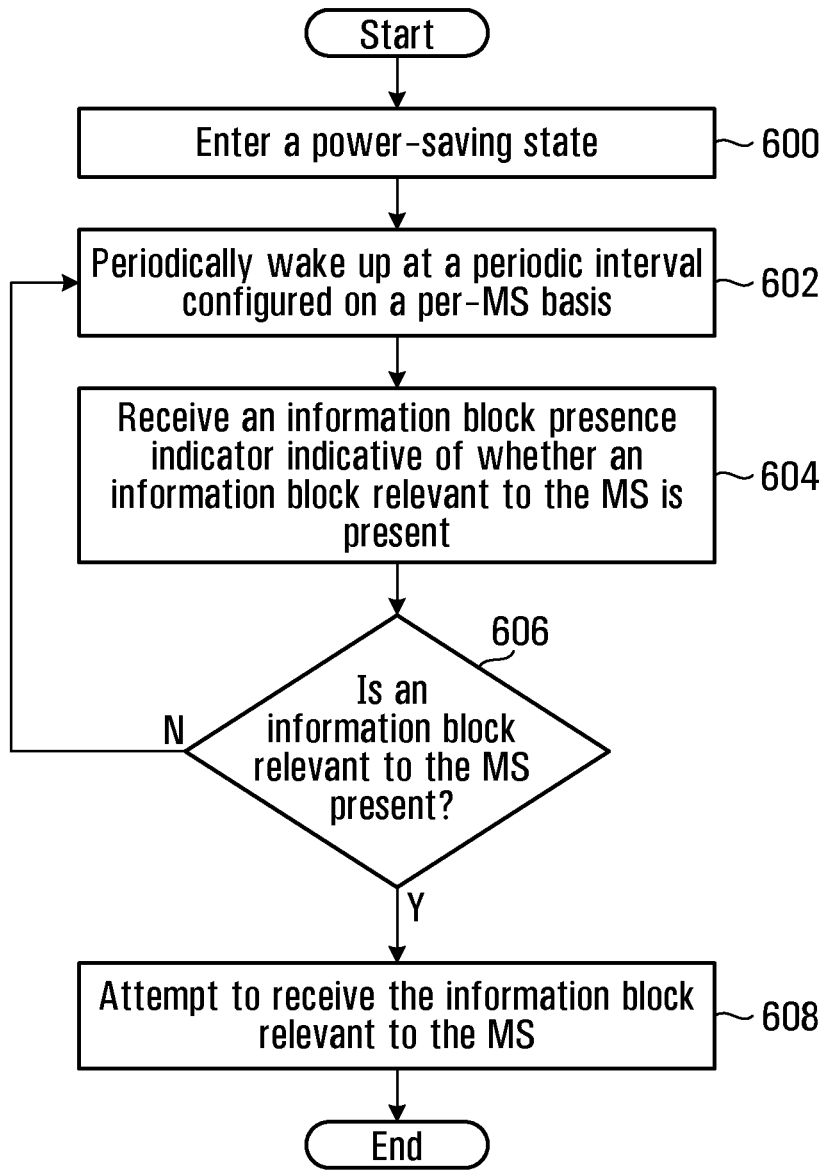
FIG. 18 is a flowchart of a method in a mobile station for receiving an information block presence indicator in accordance with an embodiment of the present invention.

FIG. 18 is a flowchart of a method in a mobile station for receiving an information block presence indicator in accordance with an embodiment of the present invention.

The method illustrated in the flowchart of FIG. 18 begins at block 600, in which the mobile station enters a power-saving state, such as sleep state or idle state;

In block 602, the mobile station periodically wakes up at a periodic interval configured on a per-MS basis and the method proceeds to block 604, in which the mobile station receives an information block presence indicator indicative of whether an information block relevant to the MS is present.

Based at least in part on the information block presence indicator received in block 604, in block 606 the mobile station determines if an information block relevant to the MS is present. If yes; 'yes' path from block 606, the method proceeds to block 608, in which the mobile station attempts to receive the information block relevant to the MS. If no; 'no' path from block 606, the method returns to block 602 and resumes periodically waking in the power-saving state.

In some embodiments, the information block presence indicator is received as part of a broadcast channel (BCH) in a superframe header in block 604 and periodically waking up at a periodic interval configured on a per-MS basis comprises periodically waking up at a multiple N of superframes, N≥1.

In some embodiments, where the power-saving state in block 600 is a sleep state, periodically waking up in block 602 to check for the presence of a information block presence indicator in block 604 comprises checking for a traffic indication information block (TFIB) presence indicator In some embodiments, where the power-saving sate in block 600 is an idle state, periodically waking up in block 602 to check for the presence of an information block presence indicator in block 604 comprises checking for a paging information block (PGIB) presence indicator.

The foregoing description includes many detailed and specific embodiments that are provided by way of example only, and should not be construed as limiting the scope of the present invention. Alterations, modifications and variations may be effected to the particular embodiments by those of skill in the art without departing from the scope of the invention, which is defined solely by the claims appended hereto.

The invention claimed is:

1. A method in a network node, the method comprising:
   transmitting an indication of a periodic interval at which system configuration information is to be transmitted;
   periodically transmitting a current version of system configuration information at the periodic interval; and
   in advance of an action time of a new version of system configuration information:
   periodically transmitting the new version of system configuration information at the periodic interval; and
   transmitting a flag indicating whether the new version of system configuration information is available.

2. The method of claim 1, further comprising:
   transmitting a system configuration information presence indicator indicative of whether system configuration information is present including an indication of length and type of system configuration information; and
   transmitting a current system configuration information identifier indicative of the version of system configuration information currently in effect.

3. The method of claim 2, wherein periodically transmitting the new version of system configuration information at the periodic interval comprises periodically transmitting:
   the system configuration identifier for the new version of system configuration information; and
   the action time of the new version of system configuration information.

4. The method of claim 2, wherein transmitting the indication of the periodic interval at which system configuration information is to be transmitted, transmitting the flag indicating whether the new version of system configuration information is available, transmitting a system configuration information presence indicator and transmitting a current system configuration information identifier comprise broadcasting the indication of the periodic interval at which system configuration information is to be transmitted, the flag indicating whether the new version of system configuration information is available, the system configuration information presence indicator and the current system configuration information identifier in a broadcast channel.

5. The method of claim 1, further comprising:
   after the action time of the new version of system configuration information, stopping transmission of the flag indicating the new version of system configuration information is available to indicate that a newer version of system configuration information is not yet available.

6. The method of claim 1, further comprising:
   in respect of each of at least one mobile station in a power-saving state, in which the mobile station (MS) is configured on a per-MS basis to periodically wake up and check for the presence of an information block relevant to the MS, transmitting an information block presence indicator indicative of whether the information block is present.

7. The method of claim 6, wherein the information block presence indicator is transmitted as part of a broadcast channel in a superframe header together with the indication of the periodic interval at which system configuration information is to be transmitted and the flag indicating whether the new version of system configuration information is available.

8. The method of claim 7, wherein the MS is configured to wake up at a multiple N of the periodic interval at which system configuration information is to be transmitted, N≥1.

9. The method of claim 6, wherein transmitting an information block presence indicator indicative of whether the information block is present comprises at least one of:
   in respect of each of at least one MS in a sleep state, transmitting a traffic indication information block presence indicator indicative of whether a traffic indication information block (TFIB) is present; and
   in respect of each of at least one MS in an idle state, transmitting a paging information block presence indicator indicative of whether a paging indication information block (PGIB) is present.

10. The method of claim 9, wherein location and modulation and coding scheme (MCS) of the TFIB and PGIB are predefined.

11. A network node comprising:
    at least two antennas;
    transmit and receive circuitry;
    a processor configured to:
      transmit an indication of a periodic interval at which system configuration information is to be transmitted;
      periodically transmit a current version of system configuration information at the periodic interval; and
      in advance of an action time of a new version of system configuration information:
      periodically transmit the new version of system configuration information at the periodic interval; and
      transmit a flag indicating whether the new version of system configuration information is available.

12. A method in a mobile station (MS), the method comprising:
    in a power-saving state:
    periodically waking up;
    receiving an indication of a periodic interval at which system configuration information is to be transmitted;

waking up at a multiple N of the periodic interval at which system configuration information is to be transmitted, N≥1;

receiving a flag indicating whether a new version of system configuration information is available; and upon determining that a new version of system configuration information is available and has not been previously received, attempting to receive the new version of system configuration information.

13. The method of claim 12, further comprising:

receiving a system configuration information presence indicator indicative of whether system configuration information is present including an indication of length and type of system configuration information; and receiving a current system configuration information identifier indicative of the version of system configuration information currently in effect, wherein attempting to receive the new version of system configuration information comprises checking the system configuration information indicator and the current system configuration information identifier.

14. The method of claim 13, wherein:

system configuration information comprises a system configuration identifier indicative of the version of the system configuration information and an action time identifier identifying when the associated version of system configuration information will take effect; and determining that a new version of system configuration information is available and has not been previously received comprises:

comparing the system configuration information identifier for the new version of system configuration information with the current system configuration information identifier for the version of system configuration information currently in effect and the system configuration information identifier for any previously received version of system configuration information.

15. The method of claim 13, wherein periodically waking up to receive: an indication of the periodic interval at which system configuration information is to be transmitted, a flag indicating whether a new version of system configuration information is available, a system configuration information presence indicator and a current system configuration information identifier comprises periodically waking up to receive a broadcast channel (BCH) containing the indication of the periodic interval at which system configuration information is to be transmitted, the flag indicating whether the new version of system configuration information is available, the system configuration information presence indicator and the current system configuration information identifier.

16. The method of claim 15, wherein periodically waking up to receive a broadcast channel comprises periodically waking up at a MS-specific interval to decode a superframe header containing the BCH.

17. The method of claim 12, further comprising:

in the power-saving state, periodically waking up to check for the presence of an information block presence indicator indicative of whether an information block relevant to the MS is present.

18. The method of claim 17, further comprising receiving the information block presence indicator in a broadcast channel (BCH) in a superframe header together with the indication of the periodic interval at which system configuration information is to be transmitted and the flag indicating whether the new version of system configuration information is available.

19. The method of claim 17, wherein in the power-saving state, periodically waking up to check for the presence of an information block presence indicator indicative of whether an information block relevant to the MS is present comprises at least one of:

in a sleep state, periodically waking up to check for the presence of a traffic indication information block presence indicator indicative of whether a traffic indication information block (TFIB) is present; and in an idle state, periodically waking up to check for the presence of a paging information block presence indicator indicative of whether a paging indication information block (PGIB) is present.

20. A mobile station comprising:

at least one antenna;

transmit and receive circuitry;

a processor configured to:

in a power-saving state:

periodically wake up;

receive an indication of a periodic interval at which system configuration information is to be transmitted;

wake up at a multiple N of the periodic interval at which system configuration information is to be transmitted, N≥1;

receive a flag indicating whether a new version of system configuration information is available; and upon determining that a new version of system configuration information is available and has not been previously received, attempt to receive the new version of system configuration information.

* * * * *